Oct. 5, 1965   I. H. CULVER ETAL   3,210,027
FIXED PITCH ROTOR HELICOPTER
Filed July 29, 1963   7 Sheets-Sheet 1

INVENTORS
IRVEN H. CULVER
J FORD JOHNSTON
WARREN D. ORR
WILLIAM E. ORR
CHARLES E. MOORE

BY Bayken, Mohler + Foster
ATTORNEYS

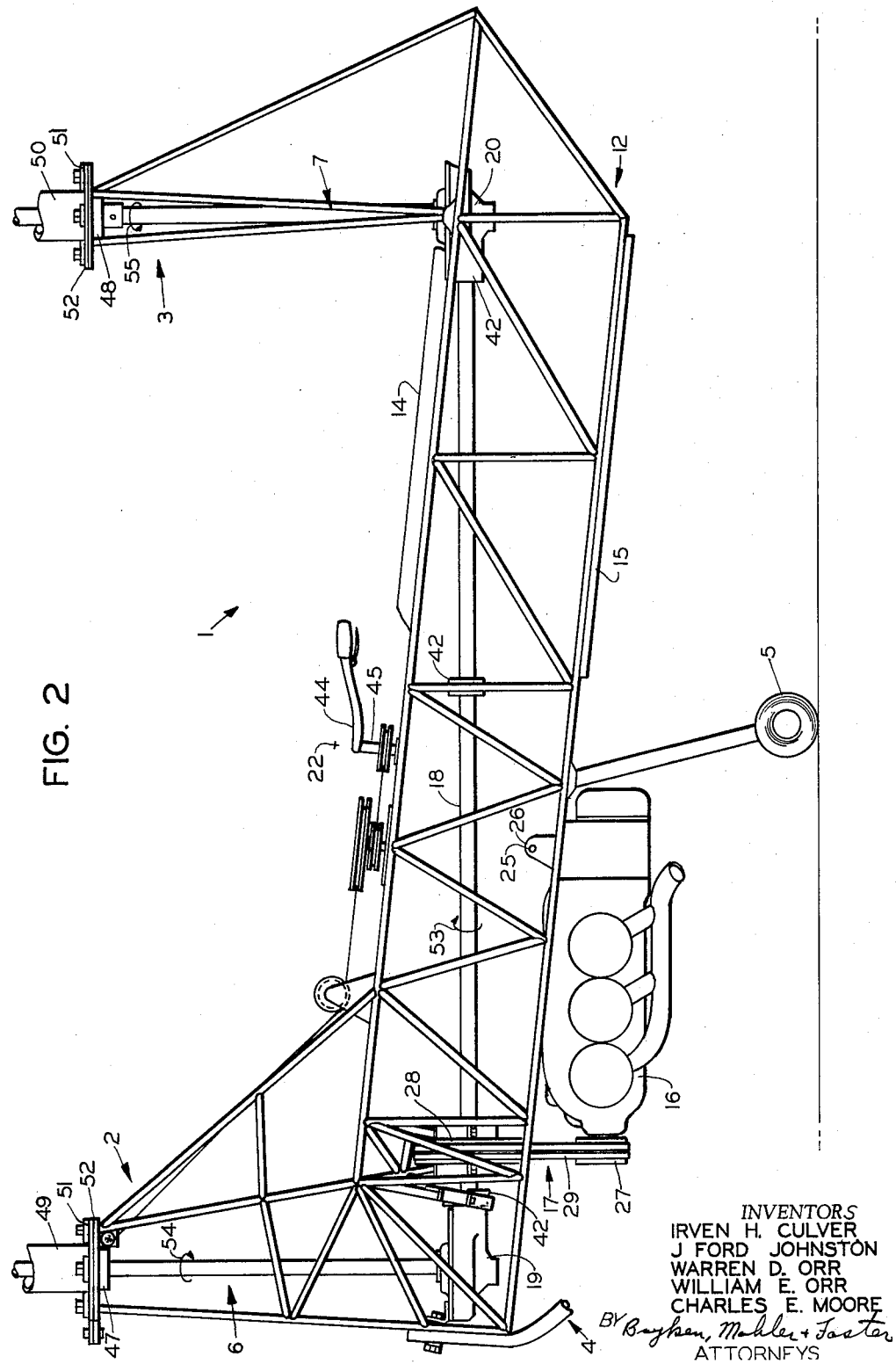

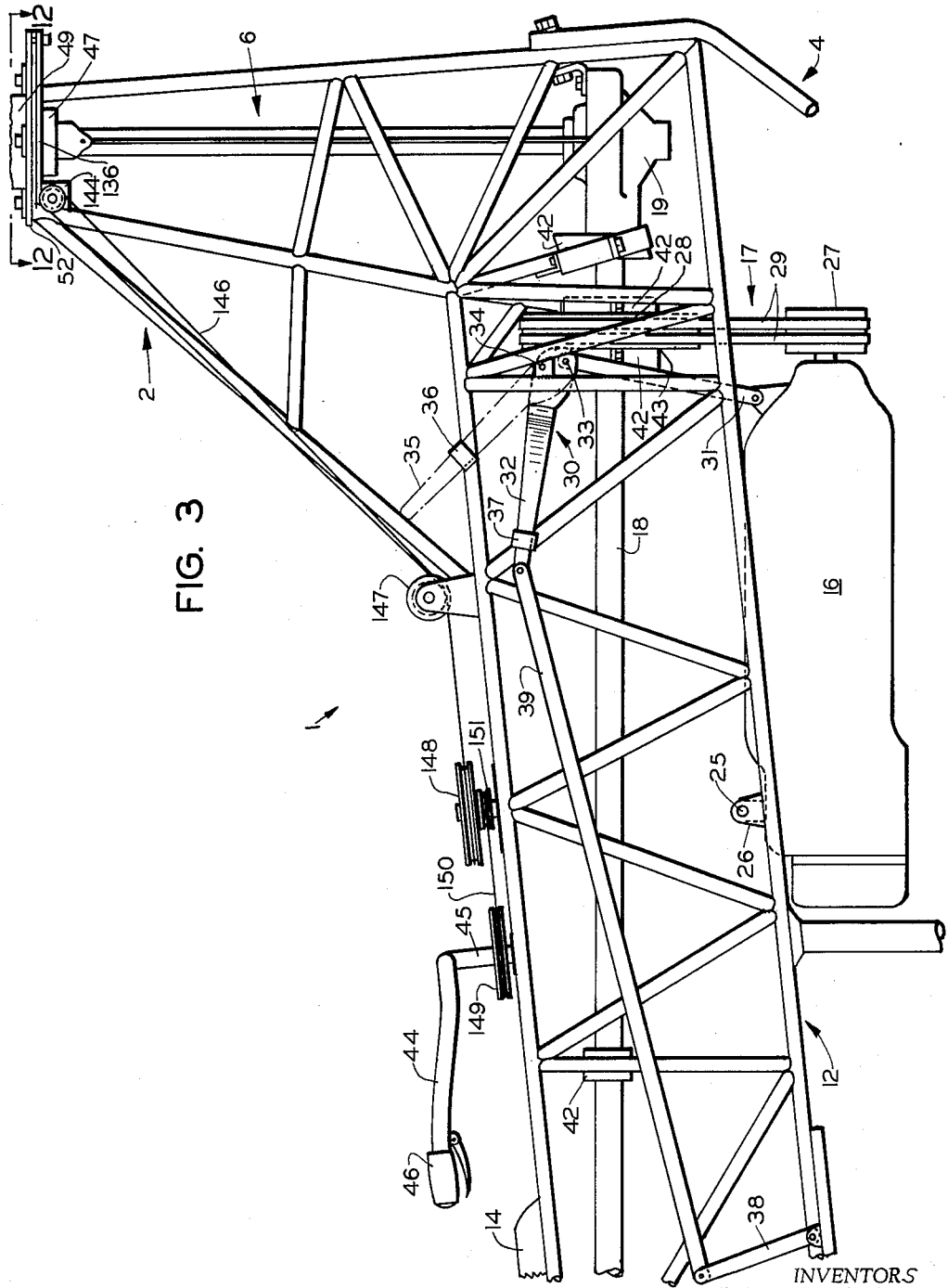

Oct. 5, 1965     I. H. CULVER ETAL     3,210,027
FIXED PITCH ROTOR HELICOPTER
Filed July 29, 1963     7 Sheets-Sheet 4

INVENTORS
IRVEN H. CULVER
J FORD JOHNSTON
WARREN D. ORR
WILLIAM E. ORR
CHARLES E. MOORE
BY Boyken, Mohler + Foster
ATTORNEYS

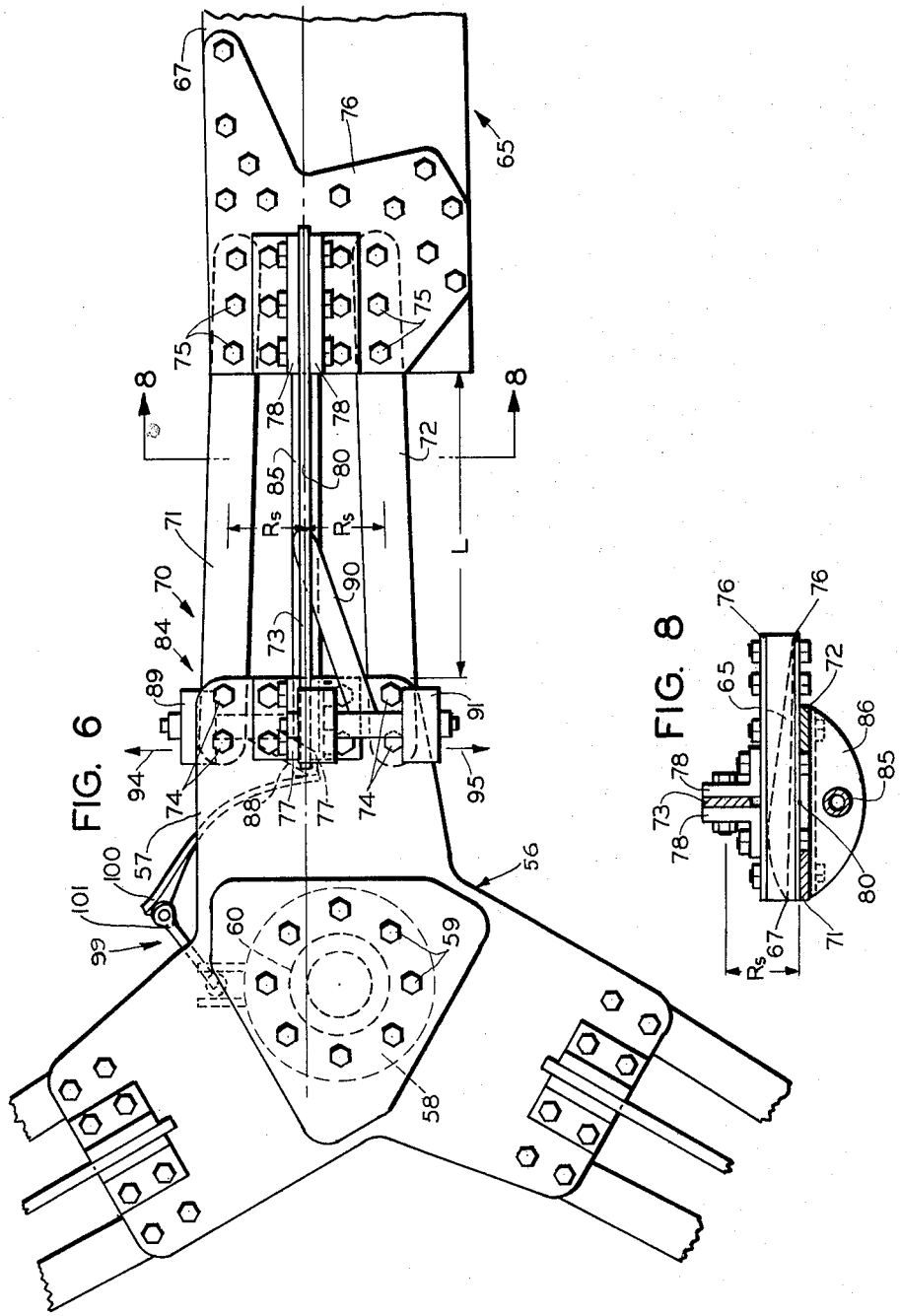

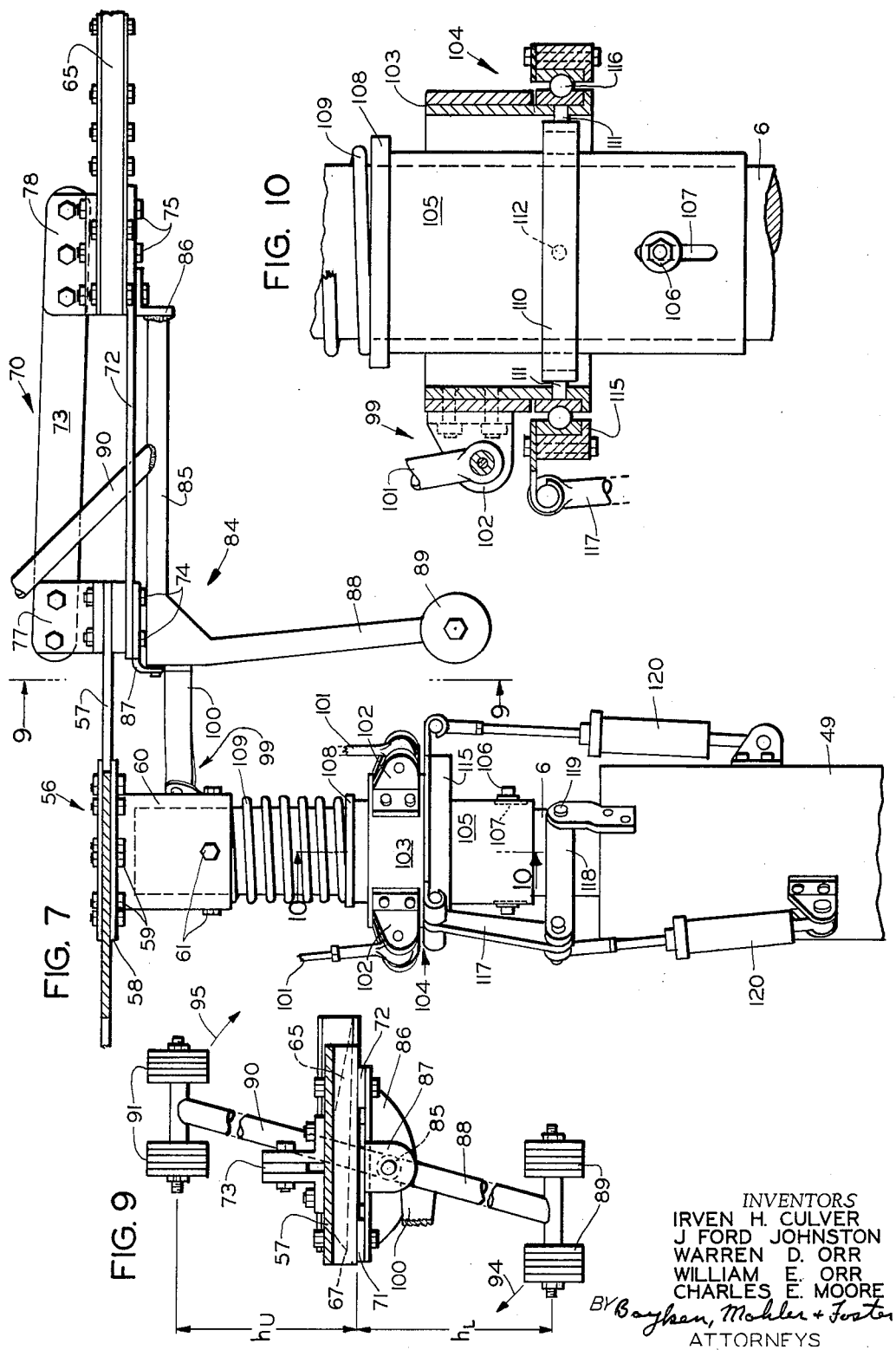

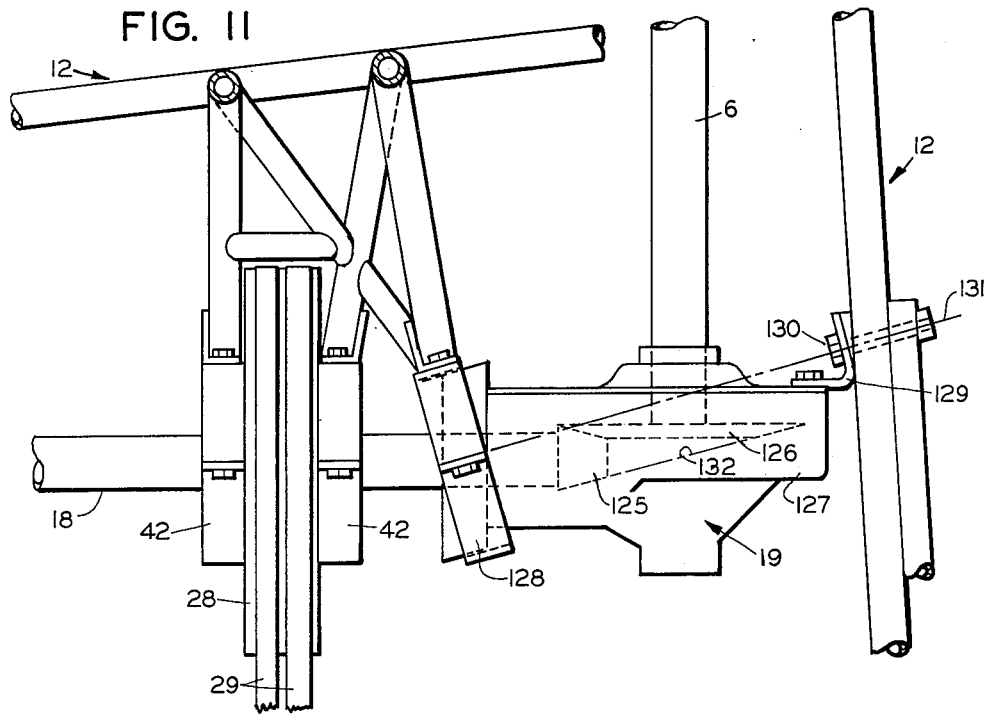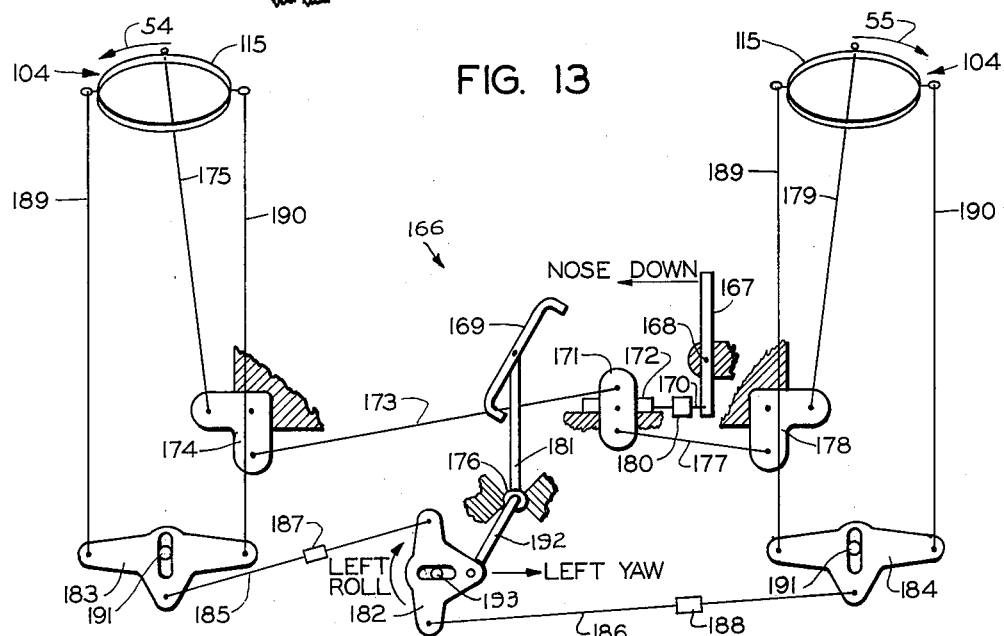

3,210,027
FIXED PITCH ROTOR HELICOPTER

Irven H. Culver, Burbank, J Ford Johnston, Sunland, Warren D. Orr, Menlo Park, William E. Orr, Palo Alto, and Charles E. Moore, Portuguese Bend, Calif., assignors to Copperfield Corporation, Menlo Park, Calif., a corporation of California
Filed July 29, 1963, Ser. No. 298,087
16 Claims. (Cl. 244—17.23)

This invention relates to small rotary wing aircraft, such as helicopters, and more particularly to a relatively small and simple helicopter for carrying one or two persons.

Conventional modern helicopters are of complex and costly construction due primarily to the articulated rotor blades which are necessarily employed to enable such helicopters to operate in controlled flight. The rotary wings or rotors of such conventional helicopters comprise a central hub from which a plurality of rotor blades extend radially. Normally each blade is connected to the hub by a complicated arrangement of pivots or hinges permitting the blade to pivot or tilt about its longitudinal axis as well as to swing or flap about an axis in the plane of rotation of the blade but normal to its longitudinal axis.

The commonly accepted control system employed with such helicopters is called cyclic or feather control. In such cyclic control systems, the pitch of each rotor blade (i.e. the angle between the zero lift line of the blade and its plane of rotation) is changed (by tilting the blade about its longitudinal axis) as it moves through a cycle of 360° of rotation. For example, in forward flight the conventional helicopter rotor is tilted forwardly (by the flapping movement of the blades about their above-mentioned normal axes) so as to provide a forward component of the lifting force of the blades. When the plane of rotation of the helicopter is thus tilted from the horizontal the angle of each blade with respect to the plane of rotation must thereby be changed throughout its cycle of rotation. The result of such cyclic control is to decrease the angle with respect to the plane of rotation of the blade advancing forwardly (into the relative wind) and to increase such angle of a rearwardly moving or retreating blade.

Vertical flight of conventional helicopters is controlled by changing the pitch of all the blades simultaneously by what is commonly called a collective pitch control means.

Azimuth steering or yaw control in helicopters having a single main rotor is usually accomplished by changing the pitch, and hence the thrust, of a small antitorque rotor mounted at the tail of the helicopter. In helicopters having two tandem counter-rotating main rotors, yaw control has been conventionally obtained by differentially tilting the planes of rotation of the main rotors relative to their shafts so that the difference in lateral tilt between the two introduces a turning moment to the helicopter fuselage.

Mere reduction in size of the complicated articulated rotor system employing cyclic control does not effect appreciable reductions in weight and may, in fact, significantly increase the cost of a small helicopter. It is therefore necessary to employ considerably simpler rotor construction and control techniques in making a small helicopter of reasonable cost.

The simplest rotor system comprises fixed rotors wherein the blades are rigidly connected to the rotor hub. In this connection it will be understood that the terms "fixed" and "rigid" as used herein designate a construction in which the rotor blades are not articulated for flapping or tilting with respect to the rotor hub.

Two primary considerations are involved in the design of a small helicopter embodying a fixed blade rotor system. The first consideration involves the ability of the rotors to autorotate under power-off conditions so as to assure safe descent of the helicopter in the event of engine failure. The second consideration involves control over the direction of flight, both vertically and horizontally, of the helicopter.

Autorotation is the property of a rotor of maintaining its angular velocity without engine power under the action of gravitational and aerodynamic forces. These forces supply the components of lift and drag which provide the necessary vertical support and energy for rotor rotation as is understood to those skilled in the art.

In conventional helicopters the pitch of the rotor blades during normal flight is substantially greater than that under which stable autorotation will occur. In the event of a power failure in such helicopters, therefore, the pitch of the rotor blades is reduced, under the control of the pilot, to a point at which the rotors will autorotate. As is indicated above, such an adjustable rotor blade system will provide both sufficient lift for normal flying conditions and stable autorotation under power-off conditions is not compatible with a simple, inexpensive helicopter to which this invention pertains.

In the design of conventional helicopters described above, the airfoil section of the rotor blades has been chosen on the basis of providing the required lift when inclined at a reasonable pitch angle of, for example, 8 to 12 degrees. Such a blade, of the required size for a conventional helicopter, may be capable of stable autorotation at pitch angles between 3 and 6 degrees. Such a blade is therefore competent for use in a helicopter having an articulated blade system wherein the pitch angle may be controlled and changed from the normal operating mode to the autorotational mode.

Reducing the size of such a rotor blade, however, for use on a small helicopter of the type to which this invention pertains, results in a substantial reduction of the Reynolds number for the airfoil section. For example, Reynolds numbers for common helicopter rotors (calculated under autorotational conditions and at a velocity station three-fourths of the blade length from the hub) are in the range of 1–5 million to over 10 million. The stall angle of any airfoil section decreases rapidly as the Reynolds number decreases.

Thus, for example, the blade sections commonly used on helicopter rotors are incapable of stable autorotation when reduced in size and operating at a low Reynolds number (in the neighborhood of one-half million) because they would have stall angles ranging from zero to four degrees. Such common blade sections if employed in a fixed pitch rotor would not, therefore, be useful in normal flight as they would not produce sufficient lift.

The invention described herein solves the above mentioned problems by providing a relatively small, low cost helicopter incorporating a novel rotor blade section which is capable of both stable autorotation at a low Reynolds number and normal powered flight at a reasonably high fixed pitch angle.

In addition, the helicopter of this invention is capable of full control under flying conditions without requiring the complicated articulated blade mounting and cyclic control systems heretofore required in conventional helicopters. Since vertical or elevation control of the helicopter of this invention is controlled primarily by the simple throttle control of the engine, the conventional and complicated system of collective pitch control is eliminated.

Furthermore, this invention contemplates the use of simplified systems for controlling movements of the small helicopter about its pitch, yaw, and roll axes during flight, the simplest of which systems utilizes the pilot's instinctive body motions.

It is therefore an object of this invention to provide a simplified, small helicopter employing a fixed-blade rotor capable of stable autorotation under power-off conditions.

Another object of this invention is the provision of a small helicopter having a simplified system of control during powered flight.

It is a further object of this invention to provide a small helicopter having tandem rotors of relatively small size and empolying a novel airfoil section which compensates for the low Reynolds number inherent in such rotors and permits operation thereof at a reasonable fixed pitch angle under both normal powered flight and autorotational modes.

Yet another object of this invention is the provision of a novel rotor shaft mounting and driving means in a tandem rotor helicopter that provides simplified yaw control.

A still further object of this invention is the provision of an automatic cyclic control system in a helicopter.

It is a further object of this invention to provide a small, fixed pitch rotor helicopter having simple means for trimming it about its pitch and roll axes, and which means may also be employed for controlling the helicopter during flight.

Other objects and advantages will become apparent from the following description in connection with the accompanying drawings, in which:

FIG. 2 is an enlarged side elevational view of the fuselage portion of the helicopter of FIG. 1, with the outer shell removed to show internal details;

FIG. 3 is an enlarged side elevational view of the forward portion of the helicopter fuselage as seen from the opposite side of that of FIG. 2;

FIG. 4 is a top plan view of one of the rotors of the helicopter of FIG. 1, including a diagrammatic illustration of the effect of a control counterweight assembly on the blades;

FIG. 5 is a greatly enlarged cross-sectional view taken along line 5—5 of FIG. 4 at the three-quarter station of one of the helicopter blades;

FIG. 6 is a greatly enlarged top plan view of the rotor hub and a portion of one of the blades of FIG. 4;

FIG. 7 is a side elevational view of the rotor hub of FIG. 6 and the upper end portion of its associated shaft and control mechanism;

FIG. 8 is a sectional view taken along line 8—8 of FIG. 6;

FIG. 9 is an end elevational view of the inner end of one of the rotor blades and a portion of its associated control mechanism as seen from line 9—9 of FIG. 7;

FIG. 10 is an enlarged sectional view as seen from line 10—10 of FIG. 7;

FIG. 11 is an enlarged side elevational view of the front rotor drive connection seen from the same side as FIG. 3 and partly broken away to show internal construction details;

FIG. 13 is a semidiagrammatic view of a trimming and control linkage connected to the control mechanism of FIG. 7.

Figure 1:
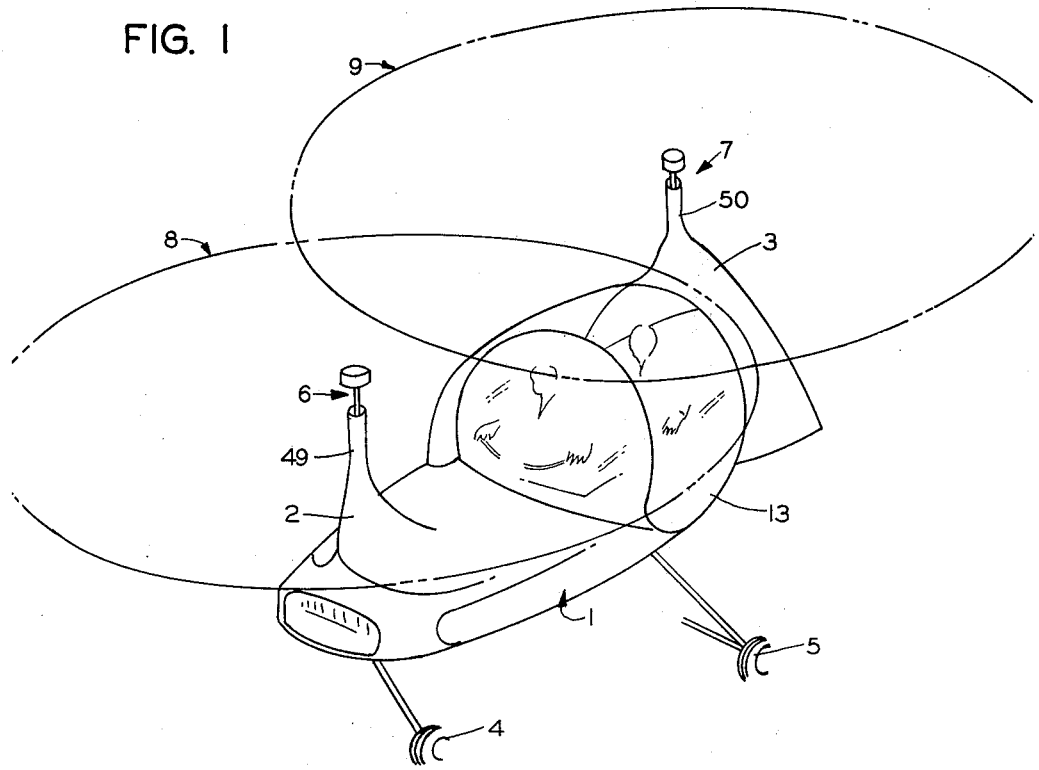
FIG. 1 is a perspective view of the helicopter of this invention.

The helicopter of this invention, shown in a simplified sketch in FIG. 1, generally comprises an elongated fuselage 1 having front and rear rotor shaft pylons 2, 3 projecting upwardly therefrom and supported on a conventional tricycle landing gear, including a nose wheel 4 and main wheels 5. Supported in and projecting upwardly from pylons 2, 3 respectively, are rotor shafts 6, 7 on the upper ends of which are mounted similar rotors 8, 9.

In its normal attitude when supported on the ground, shafts 6, 7 of the helicopter of this invention extend generally vertically and rotors 8, 9 are supported for rotation in generally horizontal planes. Rotor shafts 6, 7 are so spaced that rotors 8, 9 sweep respective circular areas which overlap an area centrally between the shafts. Preferably, the planes of rotation of rotors 8, 9 are vertically spaced from each other to reduce the possibility of interference between the rotors.

The helicopter fuselage comprises a main box frame 12 (FIG. 2) fabricated of struts of tubular aluminum or the like on which is supported the streamlined shell 13 (FIG. 1) providing the enclosure or cockpit for the pilot and his passenger. The main longitudinal portion of frame 12 is narrow enough to be straddled by the pilot and his passenger sitting on seat 14 (FIG. 2) with their feet on foot rests 15. It will be noted that the pilot sits between the pylon portions 2, 3 of the fuselage frame 12.

Frame 12 also supports the engine 16 which is coupled by belt drive 17 to the main drive shaft 18 extending longitudinally of the central fuselage portion. Drive shaft 18 is coupled by front and rear right angle gear drives 19, 20 to rotor shafts 6, 7, respectively for driving the tandem rotors.

The various components of the helicopter of this invention are so distributed that the center of gravity 22 (FIG. 2) of the composite mass of the helicopter and its occupants is located on the effective center line of thrust of the rotors. Thus, when the pilot is occupying the seat, the movement of the center of gravity of his body moves the composite center of gravity of the helicopter with respect to the effective center of thrust. It will be noted that the central portion of the fuselage 1 slants downwardly rearwardly slightly when the helicopter is supported in its normal ground or hovering attitude with rotor shafts 6, 7 extending generally vertically. As will be further explained, when the helicopter is in normal forward flight, the attitude of the central portion of frame 12 and seat 14 will be generally horizontal as the rotor shafts 6, 7 will be tilted forwardly.

Engine 16 may be of any suitable air cooled type as conventionally used in light aircraft and is supported at is rear end on a transversely extending pivot 25 (FIGS. 2, 3) mounted on frame 12, as by brackets 26. This mounting permits the forward end of motor 16, which carries drive pulleys 27 of belt drive 17 to swing toward and away from main drive shaft 18.

Said drive shaft carries pulleys 28 which are connected to pulleys 27 by a plurality of V-belts 29. When the front end of engine 16 is in the lowered position its weight hanging on belts 29 and the force of linkage 31–32 drivingly engages the belts with pulleys 27, 28 so that the engine is coupled for driving main shaft 18.

The front end of motor 16 may be raised by a belt loosening linkage, generally designated 30 (FIG. 3), including a generally vertically extending link 31 pivoted to the front end of engine 16. The other end of link 31 is pivoted to an operating lever 32 as by pivot pin 33. A pivot pin 34 serves to pivotally connect lever 32 to main frame 12 at a point spaced from pivot pin 33 so that when lever 32 is raised to the upper position, indicated by dot-dash line 35, pivot pin 33 and thereby link 31 and the front end of engine 16 are raised to an upper position in which belts 29 are loose with respect to pulleys 27, 28 and the driving connection between engine 16 and drive shaft 18 is interrupted. During such "declutching," for purposes of starting the engine without a load, it will be noted that pivot pin 33 moves rearwardly and upwardly with respect to pivot pin 34. With the engine in the lowered position pivot pin 33 is preferably slightly forwardly of pivot pin 34 to assure retention of the front end of engine 16 in the lowered, driving position. In addition, retention clips 36, 37, mounted on frame 12, are engageable by lever 32 in its upper and lower operating positions, respectively, to prevent inadvertent movement of the lever from the desired position. A pair of pivoted links 38, 39 may extend rearwardly from the rear end of operating lever 32 to the pilot's seat 14 to provide for operation of lever 32 from said seat.

Shaft 18 is mounted in suitable bearings 42 (FIGS. 2, 3) mounted on frame 12 and an overrunning clutch 43 (FIG. 3) is incorporated into driven pulley 28 so that shaft 18 may be rotated independently of said driven pulley. In case of engine failure in the air rotors 8 and 9 will autorotate, as will be later explained in detail, thereby causing rotor shafts 6, 7 to drive main drive shaft 18. It will be understood that the overrunning clutch which permits this rotation of the drive shaft may, alternatively, be incorporated in the drive pulley 27.

Mounted on frame 12 forwardly of pilot's seat 14 is a pair of handlebars 44 supported on a generally vertically extending goose neck 45 which is journalled for rotation in a suitable bearing secured to the frame. In addition to functions to be later described handlebars 44 may also incorporate suitable and conventional controls for engine 16, including a throttle control which may be conveniently operated by hand grip 46 (FIG. 3) as is conventional in motorcycle controls.

As previously described, the forward and aft ends of drive shaft 18 are respectively coupled for driving rotor shafts 6, 7 by right angle drive gear boxes 19, 20 (FIG. 2). The lower ends of said rotor shafts are journalled in suitable bearings incorporated into said gear boxes and mounted on frame 12. The upper ends of rotor shafts 6, 7 are respectively journalled in bearings 47, 48 which are supported at the upper ends of the pylon portions 2, 3 of frame 12. Also supported on the upper end of said pylon portions are torque tubes 49, 50 (FIG. 2) which respectively encompass the upper ends of rotor shafts 6, 7 which are projecting above pylon portions 2, 3. Torque tubes 49, 50 are tubular sleeves of substantially larger inside diameter than the diameter of rotor shafts 6, 7 and said torque tubes may be provided with flanges 51 at their lower ends bolted to plates 52 forming a stationary portion of the frame 12 at the upper ends of pylons 2, 3.

The upper end of each rotor shaft 6, 7 projects upwardly from the open upper end of its associated torque tube 49, 50 and is connected to the hub, generally designated 56, of its associated rotor 8, 9. Rotors 8 and 9 are identical in construction except for the fact that the blades of one are reversed from the blades of the other to adapt the rotors for rotating in opposite directions. It will be noted from the arrows 53, 54, 55 in FIG. 2 that the inherent result of coupling rotor shafts 6, 7 to opposite ends of shaft 18, rotating in the direction indicated by arrow 53, is to rotate shaft 6 in a counterclockwise direction (as viewed from above and indicated by arrow 54, FIGS. 2, 4) and shaft 7 in a clockwise direction (indicated by arrow 55, FIG. 2). Except for this counter rotation, to eliminate torque effects on the helicopter fuselage, rotors 8, 9 are constructed and operated in an identical manner. The description of front rotor 8 (FIG. 4) herein is therefore intended to apply equally to rear rotor 9 unless specifically designated otherwise.

Rotor hub 56 comprises a flat Y-shaped plate 57 (FIGS. 4, 6, 7) secured to the flange 58, as by bolts 59 (FIGS. 6, 7), at the upper end of a tubular sleeve 60. Sleeve 60 receives therein the upper end of rotor shaft 6 (FIG. 7) to which said sleeve is secured, as by bolts 61. In this manner the rotor hub 56 is secured to the rotor shaft for rotation therewith.

Connected to and extending radially from each leg of the Y-shaped plate 57 is an elongated rotor blade 65 (FIG. 4). Although a three-bladed rotor, in which each of the legs of plate 57 and the blades 65 are located 120 degrees apart, is herein illustrated, it is obvious that any other number of blades, located in a balanced pattern, may be employed if desired. A three-bladed rotor is deemed preferable to a rotor having only two blades mounted 180 degrees apart because the former produces a lower level of vibration in the helicopter.

The blades 65 are identical in construction and in their connection to rotor hub plate 57. Throughout the operative portion of its length (i.e., approximately the outer three-fourths of the length from the rotor hub center) each blade 65 is of constant cross section. The airfoil section to which the blade is formed is shown in FIG. 5 on a greatly enlarged scale, as taken at a station three-fourths of the length of the blade from the center of hub 56. Such an airfoil is known as a "forward cambered mean line" airfoil section in that its point 66 of peak or maximum camber (thickness) is within the first quarter of the chord of the blade from its leading edge 67. It will also be noted from FIG. 5 that the blade section employed in the helicopter of this invention is provided with a very sharp leading edge 67 and has an aft section 68 which is flat, i.e. not positively cambered.

FIG. 5 also illustrates the pitch angle of blade 65 which is the angle between the plane of rotation of the blade (horizontal in hovering flight) and the zero lift line which is an extension of the aft portion of the mean line of the airfoil section. As will be later explained in greater detail, the rotor blades of the helicopter of this invention are mounted on the hub at a fixed pitch angle of substantially five to eight degrees.

In a small helicopter constructed in accordance with this invention the length of the rotor blades, from the center of the hub to the outer end of the blade, may be of the order of seven feeet with a blade width from leading edge 67 to trailing edge 69 of approximately five and one-half inches. A blade constructed to such approximate dimensions and operating under autorotational conditions (with its velocity calculated at a station ¾ of the blade length from the hub, as is conventional) has a Reynolds number in the neighborhood of 0.5 million. At such low Reynolds numbers helicopter blades of conventional airfoil sections are not capable of stable autorotation at pitch angles in the neighborhood of five to eight degrees. The airfoil section herein described is thus necessary to the operation of a small, fixed pitch helicopter under both normal powered flight and stable autorotational modes.

In the specific form of the invention disclosed herein each blade 65 is connected to its respective leg of plate 57 by connecting means, generally designated 70 (FIGS. 4, 6). Each of said connecting means comprises a plurality of elongated, relatively thin straps, a pair of such straps 71, 72 (FIG. 6) lying in a generally horizontal plane and a third strap 73 lying in a vertical plane. The inner ends of straps 71, 72 are secured to plate 57, as by bolts 74, and the outer ends thereof are secured to the inner end of blades 65, as by bolts 75 through said blade and reinforcing plates 76.

The inner end of strap 73 is secured between a pair of upstanding brackets 77 secured to plate 57, and the outer end of said strap is secured to the inner end of blade 65, as by upstanding brackets 78 (FIG. 8). Preferably, straps 71, 72 are secured to the underside of plate 57 and blade 65 whereas vertical strap 73 is secured to the upper side thereof.

Straps 71, 72 and 73 are thereby arranged in a spaced, triangular pattern about the approximate mid-chord point of blade 65 as seen in FIG. 8. The longitudinal center lines of straps 71, 72 and 73 converge from this spaced arrangement at the rotor hub 56 (FIG. 6) to a point 81 (FIG. 4) approximately at the middle of the blade section at the three-quarter station of the blade length. This approximate middle point on the blade section and the line of intersection of the planes of the straps is aft of the line of centers 79 (FIG. 4) of lift and mass of the blade which is at approximately one-fourth of the chord from the leading edge 67.

Straps 71, 72 and 73 are of sufficient width and thickness as to be substantially rigid, when mounted in the pattern described, against movement of blade 65 with respect to hub 56 in both horizontal and vertical directions (i.e., in the plane of rotation of the rotor and normal thereto). Said straps are, however, sufficiently thin, resilient and flexible to permit limited twisting movement of blade 65 with respect to plate 57 of hub 56. Under certain conditions to be described, such twisting of the blade takes place about the feathering axis 80 (FIGS. 4, 6, 8) extending generally longitudinally and centrally of the blade from slightly forward of the center of the rotor hub through the point 81. The feathering axis 80 is thereby coincident wtih the line of intersection of the planes of straps 71, 72 and 73 and is aft of the line 79 of lift and mass centers.

It will therefore be understood that each rotor blade incorporated in this invention is secured to its respective hub by rigid, i.e., nonarticulated, connecting means 70 at a fixed pitch angle of substantially five to eight degrees. It will also be understood that other simple connecting means may be employed to so rigidly connect blade 65 to hub 56 and, at the same time, permit sufficient twisting of the operative portion of the blade about feathering axis 80 under the conditions to be hereinafter described.

Each blade 65 carries a control counterweight assembly, designated 84 (FIGS. 6, 7, 9) principally for the purpose of effecting control over the helicopter rotors under flying conditions. Each said counterweight assembly includes a rod 85 extending generally longitudinally of blade 65 and having its outer end rigidly secured by a bracket 86 (FIG. 7) to the inner end of the operative portion of said blade. The inner end of rod 85 is journalled for rotation in a bracket 87 secured to hub plate 57. Depending from the inner end of rod 85 is an arm 88 carrying a weight 89 at the lower end thereof. Arm 88 is rigidly secured to rod 85 and extends downwardly from (FIG. 7) and forwardly of (FIG. 9) blade 65 (i.e., in the direction of movement of said blade). A second arm 90 has one end rigidly secured to rod 85 intermediate its ends and extends slantingly upwardly and inwardly toward the center of rotation of the rotor. Arm 90 extends above blade 65 (FIG. 7) and rearwardly (FIG. 9) of the direction of movement thereof and carries weight 91 at its outer end remote from rod 85.

As will be later explained in detail, applying a disturbing force to control counterweight assembly 84 causes movement of weights 89, 91 forwardly or rearwardly of blade 65 about the longitudinal axis of rod 85 (about which said weights are constrained to move) and correspondingly causes the application of a turning moment through arms 88, 90 to rod 85 and thence through bracket 86 to blade 65. Such movement effects a change in the pitch angle of the rotor blade by twisting the same about its feathering axis 80.

This tilting or twisting of the rotor blade is resisted by the stiffness of the connecting means 70, including straps 71, 72 and 73. It will be obvious that as the speed of rotation of the rotor increases, the centrifugal force applied by blade 65 tends to elongate straps 71, 72 and 73 thereby markedly increasing their "stiffness" and requiring substantially greater force to twist said straps about the feathering axis in order to change the pitch of the rotor blade.

Weights 89, 91 are thereby supported at the ends of arms 88, 90 in positions leading and trailing, respectively, the associated blade (FIG. 9) so as to perform the additional function of applying increasing forces tending to increase the pitch angle of blade 65 at increasing rotor speeds, and vice versa. For example, as the rotor speed increases weights 89, 91 function similarly to the weights of a conventional fly-ball governor and, under the influence of increased centrifugal force tend to move outwardly away from the center of rotation of the rotor. Since weights 89, 91 are constrained to move about the axis of rod 85 they cannot move radially outwardly of rotor shaft 6. Under such conditions weights 89, 91 must, therefore, move forwardly and rearwardly, respectively, of blade 65, as indicated by arrows 94, 95 (FIGS. 6, 9). Such movement causes the application of a greater force tending to increase the pitch angle of blade 65.

In a multi-bladed rotor as disclosed herein it is desirable to provide means, generally designated 99 (FIG. 7) connecting the several counterweight assemblies of one rotor for "tracking" together. Said means includes an arm 100 (FIGS. 7, 9) rigidly secured to the rod 88 of each control counterweight assembly and projecting transversely therefrom. The outer end of each arm 100 is pivotally connected to one end of a link 101, the other end of which is connected to one of the ears 102 radially projecting from the rotating ring 103 (FIG. 7) of a swash plate assembly, generally designated 104. Ears 102 are 120 degrees apart and each is 90 degrees ahead (in the direction of rotor rotation) of its respective blade and counterweight assembly.

Ring 103 encircles rotor shaft 6 and is provided with a number of ears 102 spaced circumferentially thereof corresponding to the number and spacing of rotor blades 65 and counterweight assemblies 84. Since all the counterweight assemblies 84 are connected by links 101 to ring 103 each said assembly is constrained to follow the path of, i.e., "track," the others, assuming ring 103 is restrained from wobbling. In addition, ring 103 provides a convenient means through which disturbing forces may be applied to all the control counterweight assemblies 84.

Swash plate assembly 104 includes an elongated tubular sleeve 105 slidably received on the upper end of rotor shaft 6 below hub 56 (FIGS. 7, 10). Bolts 106 projecting through axially elongated slots 107 in sleeve 105 and secured to shaft 6 serve to connect said sleeve to said shaft for rotation therewith but permit axial sliding of the sleeve 105 along said shaft.

At its upper end sleeve 105 is provided with a radially projecting flange 108 which abuts a helical coil compression spring 109 (FIG. 7). Spring 109 surrounds shaft 6 and extends between said flange and the lower end of sleeve 60 of rotor hub 56 for urging sleeve 105 downwardly on shaft 6. The engagement of bolts 106 with the upper ends of slots 107 limits the downward movement of sleeve 105 (FIG. 10).

Ring 103 surrounds sleeve 105 and is connected thereto for rotation therewith by gimbal ring 110 (FIG. 10), pivotally connected to ring 103 along one axis by radially outwardly projecting pins 111 and along a second, normal axis to sleeve 105 by radially inwardly projecting pins 112. Since the inside diameters of gimbal ring 110 and rotating ring 103 are substantially larger than the outside diameter of sleeve 105, said rotating ring may tilt in any direction about the perpendicular axes of pins 111, 112 with respect to sleeve 105 and shaft 6.

Swash plate assembly 104 also includes a stationary or nonrotating ring 115 supported on the lower circumference of ring 103 by a bearing 116 for relative rotation between rings 103 and 115 about their common central axis.

Stationary ring 115 is held against rotation relative to the helicopter fuselage by a link 117 pivotally connected thereto and to a yoke 118 (FIG. 7) which is pivotally connected, as at 119, to fixed lugs on the upper end of torque tube 49. In this manner, ring 115 is supported for tilting movement with ring 103 but is held against rotation therewith. In order to damp out vibrational forces and prevent wobble of swash plate assembly 104 thus constraining counterweight assemblies 84 to track each other, a plurality of symmetrically arranged dash pot dampers 120 are connected between ring 115 and torque tube 49.

As will be later explained in greater detail, when the pilot of the helicopter of this invention changes his center of gravity by leaning (to the left or right or forward or backward) the helicopter moves in the direction in which he is leaning due to the reaction of the tandem rotors and their respective control counterweight assemblies. During such "body motion" control, however, both rotors react in substantially the same manner thereby providing control about the helicopter's pitch or transverse axis (by the pilot's leaning forward or backward) and control about the roll or longitudinal axis (by the pilot leaning to one side or the other). For yaw control, the means hereinafter described for effecting a reaction in only one of the two rotors is provided.

As previously explained, the lower end of forward rotor shaft 6 is connected to main drive shaft 18 by right angle gear drive 19. Said right angle gear drive includes a pair of meshed bevel gears 125, 126 (FIG. 11) connected to the ends of the respective shafts 18, 6 and supported in a housing 127, including bearings for the ends of the shafts. Housing 127 is supported on frame 12 by a rear bearing clamp 128 and a forward bracket 129 pivoted, as by pin 130, to said frame, for tilting about an axis 131 (FIG. 11) aligned with the pivot axes of pin 130 and bearing clamp 128. Pivot axis 131 lies in the plane of shafts 6, 18 and is parallel with an inclined line 132 drawn between the effective faces of engagement of gears 125, 126. In this manner the torque forces applied by main drive shaft 18 do not tend to tilt gear box 19 and shaft 6 about axis 131 because of the tangent of the angle between said axis and drive shaft 18 is the same as the gear ratio of drive 19.

In order to permit tilting of rotor shaft 6 from side to side out of a vertical plane about axis 131, the upper bearing 47 (FIG. 3) supporting said shaft is mounted in a flanged recess 135 (FIG. 12) in a movable plate 136 supported at the upper end of pylon portion 2 of the helicopter fuselage (FIG. 3). Plate 136 is supported below and generally parallel to plate 52 which is secured to the upper ends of the members of frame 12 at pylon portion 2.

A forwardly extending ear 137 (FIG. 12) on plate 136 is pivoted, as by pin 138, to fixed plate 52. A rearwardly extending ear 139 of plate 136 is connected, as by pin 140, to a travelling nut 141 threadedly received on a jack screw 142.

Figure 12:
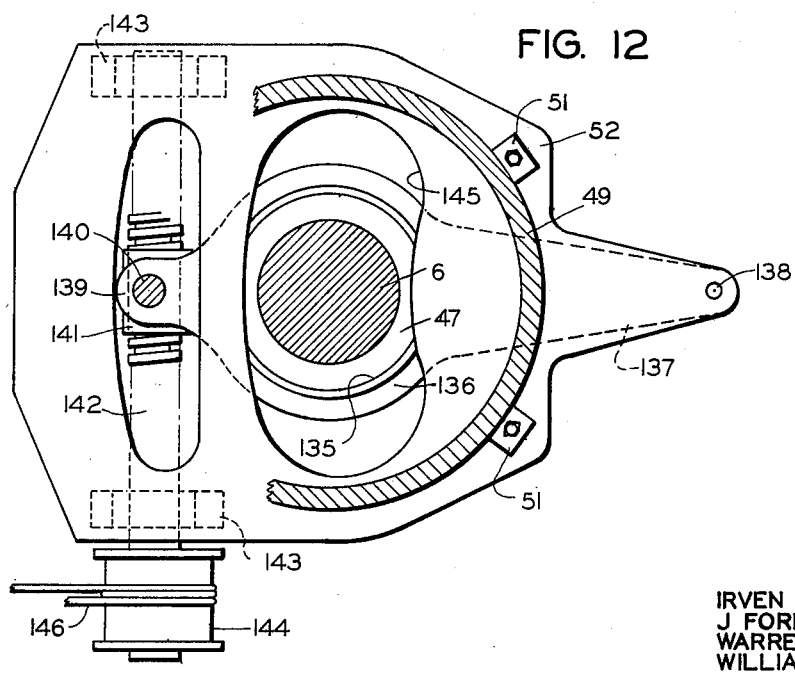
FIG. 12 is a sectional view as seen from line 12—12 of FIG. 3.

Jack screw 142 extends transversely of the longitudinal axis of the helicopter fuselage and is supported at its ends for rotation in bearings 143 secured to the underside of plate 52. At one of its ends outward of one of bearings 143 jack screw 142 carries an operating spool 144 (FIG. 12).

Turning jack screw 142 by spool 144, in a manner to be described, causes nut 141 to be translated therealong thereby swinging plate 136 in a horizontal plane about pivot 138. During such movement plate 136 carries bearing 47 and the upper end of shaft 6 with it, thereby tilting said shaft out of the central vertical plane of the fuselage. Shaft 6 tilts about axis 131 (FIG. 11) as previously described.

It will be noted that an elongated aperture 145 (FIG. 12) is provided in fixed plate 52 and the inside diameter of front torque tube 49 is sufficiently large to permit significant sidewise movement of the upper end portion of rotor shaft 6.

An endless control cable 146, wrapped around operating spool 144 (FIG. 12), extends under idler pulleys 147 (FIG. 3) and around a large pulley 148 which is supported on the main fuselage portion forward of handle bars 44. Cable 146 is connected to pulley 148 so that rotation of the same causes said cable to rotate spool 144 and jack screw 142. Handlebars 44 are operatively connected to pulley 148 for rotating the same by a pulley 149, mounted on goose neck 45, connected by a belt 150 to a small pulley 151, secured on a common shaft to pulley 148. In this manner, swinging handlebars 44 from side to side causes forward rotor shaft 6 to tilt from side to side. It will be obvious that rear rotor shaft 7 could be similarly mounted if desired, but, for purposes of yaw control the latter is unnecessary.

In operation of the helicopter of this invention the engine 16 (FIGS. 2, 3) is started with operating lever 32 in the forward position, shown by dot-dash line 35, so that belts 29 are slack and the driving relationship with shaft 18 is interrupted. Once the engine is warmed up and the pilot mounted on seat 14, retraction of link 39 engages belt drive 17 (FIG. 3) and the engine thus drives rotors 8, 9 in counter directions through rotor shafts 6, 7. As the throttle control 46 is advanced the rotational speed of rotors 8, 9 increases to the point where blades 65 develop sufficient lift to overcome the weight of the helicopter and its pilot and liftoff occurs.

Thereafter the pilot may control the elevation of the helicopter (i.e. vertical ascent and descent) by changing the engine throttle setting, and at a particular setting at which the lift forces developed by the rotors balance gravity, the helicopter hovers.

Rotors constructed in accordance with the description herein and including the blade section of FIG. 5 mounted at a fixed pitch angle of approximately six degrees develop sufficient lift to overcome the action of gravity on the small helicopter of this invention, its pilot, and a passenger with an engine 16 of corresponding suitable size and power.

In the event of engine failure in the air the helicopter of this invention descends thereby creating a relative flow of air upwardly through the helicopter rotors which is opposite to the downward flow of air caused by the driven rotors under normal powered flight conditions. For reasons which are well known to those skilled in the art the upward flow of air through the rotors causes autorotation, assuming that the pitch angle at the Reynolds number under autorotational conditions is significantly less than the pitch angle at which stalling of the rotor blade section occurs.

Because of the sharp leading edge and the forward camber of the airfoil section of this invention as illustrated in FIG. 5, separation of the airflow past said section occurs at the sharp leading edge thereby creating an immediately adjacent turbulent region. Immediately aft of the turbulent region, turbulent reattachment of the airflow occurs because of the location of the forward camber adjacent the sharp leading edge. The turbulence created at the leading edge thereby functions both to reattach the boundary layer airflow to the airfoil section (FIG. 5) immediately aft of the leading edge, as well as to draw energy from the free air stream to maintain fine grain turbulence and high energy in the boundary layer airflow and thereby prevent separation over substantially the entire upper surface of the blade. If it were not for the sharp leading edge and forward camber of the airfoil embodied in this invention, the airfoil would exhibit stalling characteristics during attempted autorotation at the low Reynolds number here involved and at a pitch angle above approximately three degrees. Such stalling would destroy the lift capabilities of the blade and the forward component of the lifting force that causes the blade to autorotate.

The blade section of this invention is, however, suitable for both normal powered flight and capable of stable autorotation under power-off conditions when mounted at a fixed pitch angle of approximately five to eight degrees as illustrated in FIG. 5. The small helicopter of this invention, incorporating the fixed pitch rotors herein described is thus capable of throttle controlled, power ascent and descent as well as safe descent under power-off, autorotational conditions.

FIG. 4 includes a diagrammatic illustration of the vertical central plane of the helicopter, denoted by dashed line 154 on which the forward direction of movement is indicated by an arrow, and the four 90-degree positions through which the lower blade 65 travels in one complete cycle of rotation of the rotor 8. At each of positions 2, 3 and 4 (encircled on FIG. 4) the section of the blade is diagrammatically illustrated with reference to a dashed line representing the plane of rotation of the rotor, and FIG. 5 is a comparable illustration for the blade in position 1 (encircled, FIG. 4).

The pilot may control the helicopter of this invention in pitch and roll by his instinctive body movements. For example, if, in hovering flight, the pilot leans to his right (as he is sitting on seat 14 facing forward) the composite center of gravity of helicopter and pilot is shifted to the right of the vertical longitudinal plane 154 (FIG. 4) of the helicopter including rotor shafts 6, 7. Such shifting of the center of gravity introduces a bending moment to the upper portion of front rotor shaft 6 which tends to recover to the right, thereby introducing a force tending to raise the blade 65 at position 1 (FIG. 4).

This force acts upwardly, distributed along the line of the feathering axis 80, and is resisted by the mass and gyroscopic inertia of the rotor blade acting oppositely (i.e. downwardly, at position 1), distributed along the line of mass centers 79 of the blade. This set of acting and reacting forces constitutes a couple tending to rotate the control counterweight assembly 84 and the blade leading edge downward about the feathering axis 80 at position 1. Full blade feathering rotation (displacement of the blade section about axis 80) does not occur immediately, however, because of the inertia of the control counterweight assemblies 84. The maximum feathering displacement (of the blade leading edge downward) occurs at position 2, 90 degrees of rotor rotation after position 1, when the inertia of counterweight assemblies 84 is properly adjusted with respect to the centrifugal feathering stiffness due to the retention straps 71, 72, 73, so as to make the natural feathering or blade twisting frequency equal to the rotational speed. This condition is closely approximated when the following formula is satisfied:

$$N^2(W_u h_u^2 + W_l h_l^2) = \frac{W_b \overline{R}_b R_s^2}{2L} N^2$$

Where:

N—Rotor speed, r.p.m.
$W_u$, $W_l$—weight of upper and lower counterweights 91 and 89, respectively, pounds;
$h_u$, $h_l$—vertical height of counterweights 91 and 89 respectively above and below the plane of rotation (FIG. 9), feet;
$W_b$—weight of blade 65 outboard of connecting strap assembly 70, pounds;
$\overline{R}_b$—distance from center of rotor rotation to center of gravity 82 of blade (FIG. 4), feet;
$R_s$—mean distance from feathering axis 80 to middle of connecting straps 71, 72, 73 (FIGS. 6, 8), feet;
L—free length of connecting straps (FIG. 6), feet.

In the above equation the right-hand side is proportional to the centrifugally induced restoring moments about the feathering axis 80 (due to the straps 71, 72, 73) and the left-hand side is proportional to the inertial upsetting moments due to the counterweight assembly 84 about the same axis, both per unit (such as degrees) of feathering oscillation. When this formula is satisfied the upsetting and restoring moments are equal for feathering oscillations of any amplitude at a frequency of one cycle per revolution.

In this invention, the inertia of the counterweight assembly 84 is adjusted to satisfy the preceding formula, with the previously stated result that the natural feathering frequency is equal to the rotor rotational frequency. This means that a moment applied about the feathering axis at position 1 will cause the blade pitch to oscillate harmonically one full cycle per revolution of the rotor, reaching maximum but opposite angular deflections at positions 2 and 4 (FIG. 4) and passing through the original or neutral attitude in positions 1 and 3. As illustrated in FIG. 4, the blade leading edge or nose-down feathering moment in blade position 1 due to the pilot's leaning to the right causes the blade to have maximum nose-down attitude in position 2 and maximum nose-up attitude in position 4, and to pass through neutral attitude in positions 1 and 3. The magnitude of the harmonic motions in feathering (with respect to the original plane of rotation) will increase continuously as long as the pilot continues to lean to the right.

The cyclic changes in blade feathering attitude just described produce downward aerodynamic forces on the blade in the region of position 2 and upward aerodynamic forces in the region of position 4. Inasmuch as the rotating blade constitutes an element of a gyroscope (the three blades together constitute a complete gyroscope), the above aerodynamic forces at positions 2 and 4 cause the blade to precess down at position 3, 90 degrees of rotation after the downward aerodynamic force, and up at position 1, following the well-known law of gyroscopic precession.

The effect of the described precession during the rotation of a rotor blade through 360 degrees is to cause the blade to fall from position 1 to position 3 and to climb from position 3 to position 1. Since each rotor blade follows the same path of movement under the described conditions, the plane of the rotors is thus tilted downwardly on the right side of the helicopter of this invention. As long as the bending moment caused by the shifting of the centers of gravity to the right remains on the rotor shaft 6, angular displacement of the plane of rotation of the rotor about the roll axis of the helicopter continues. Such tilting ceases when the bending moment is no longer applied to the rotor shaft (i.e., when the shaft has recovered and is perpendicular to the plane of the tilted rotor).

With its rotors tilted downwardly to the right as in the example given, the helicopter is translated laterally through the air due to the lateral component thus effected in the lifting force of the rotors. Thereafter, lateral translation of the helicopter continues until the rotor planes are returned to the horizontal by a reverse process. It will be understood that both of the rotors 8, 9 react in the same manner except for differences occasioned by their opposite directions of rotation.

It will also be noted that the path described by the rotor blades is not a true plane but an inverted, shallow cone due to the inherent flexibility of the rotor blades and their ability to flex upwardly at their outer ends. The description with respect to the rotor "plane" of rotation is, therefore, a simplification which is nonetheless accurate.

Control about the pitch axis of the helicopter is correspondingly effected in a similar manner by the instinctive body motions of the pilot leaning forwardly or rearwardly and thereby shifting the composite center of gravity forward or aft of the centerline of thrust between the tandem rotors.

In order to effect yaw control of the helicopter of this invention handlebars 44 may be turned to one side or the other. As previously explained, such swinging of the handlebars turns jack screw 142 (FIG. 12) thereby applying a force to the upper end of forward rotor shaft 6 tending to tilt the same. The forward rotor 8 reacts to such tilting in the same manner as described with respect to the application of a bending moment to the rotor shaft caused by the pilot's leaning movement. Since only the forward rotor so reacts, thus translating only the forward portion of the helicopter laterally relative to the aft portion, control about the yaw axis is effected.

As these various body-motion and handlebar manipulation maneuvers are accomplished the tracking means 99 (FIG. 7) causes each blade and its control counterweight assembly to follow the same feathering action at the same location in each cycle of rotation of the rotor. Thus, by the use of the simplified yet rugged fixed-pitch system herein described, the equivalent of conventional cyclical pitch control is obtained. During such cyclical pitch change swash plate assembly 104 tilts slowly (downwardly to the right in the previous example of the pilot leaning and rolling to the right) with respect to the axis of the rotor shaft in response to the cyclical movement of control counterweight assemblies 84 and blades 65 about their feathering axes. Dash pot dampers 120 permit such slow tilting of the plane of rotation of gimbal-mounted ring 103 but resist rapid wobbling of such ring out of such plane.

Since increased rotor velocity tends to move control counterweights 89, 91 in the direction of arrows 94, 95 (FIGS. 6, 9), the connection of counterweight assemblies 84 through links 101 to ring 103 tends to raise the swash plate assembly 104 upwardly toward hub 56 (FIG. 7). Spring 109 is selected to have such a force as to control the raising and lowering of the switch plate assembly 104 to the degree necessary to effect reasonable collective pitch change with increased rotor speed.

As has been previously explained, ring 115 of swash plate 104 is supported for tilting movement and raising and lowering movement with rotating ring 103, but the former is held stationary against rotation. Since both rings of swash plate 104 tilt in response to cyclic pitch changes of the rotor blades effected in the previously described manner, nonrotating ring 115 may be employed as a means of inducing forces to the swash plate to effect cyclic pitch changes thereby affecting the attitude of the helicopter.

As an alternative to accurately balancing the helicopter structure and its passengers so that the combined center of gravity falls in the proper location (FIG. 2) forces may be applied to each swash plate 104 through its ring 115 to trim the attitude of the helicopter to secure the proper flight characteristics. Such forces may be applied by means of a control linkage, generally designated 166, semidiagrammatically illustrated in FIG. 13 as connected to the nonrotating rings 115 of the swash plates 104 of the forward and aft rotors, respectively.

Such linkage preferably includes a generally vertically extending first control lever 167 pivoted to the frame of the helicopter, as at 168, for swinging forward and aft about a generally horizontal axis. Below pivot 168 lever 167 is connected, as by a generally horizontally extending link 170 to a generally vertically extending cross link 171 which is secured to a slide 172 supported on the helicopter frame for sliding forward and aft.

At its upper end cross link 171 is connected by a pivoted link 173 through bell crank 174, pivoted to the helicopter frame, and generally vertically extending link 175 to a point on the right-hand side of forward rotor ring 115.

The lower end of cross link 171 is likewise connected by a link 177 to a similar bell crank 178, pivoted to the helicopter frame, and thence through a generally vertically extending link 179 to a point on the right-hand side of aft rotor ring 115. Preferably, a spring cartridge 180 is interposed in link 170 so that displacement of control lever 167 applies a force to cross link 171 through slide 172 tending to displace said cross link.

Displacing control lever 167 forwardly (in the direction of the "nose down" arrow), for example, tends to retract slide 172 and cross link 171 in an aft direction thereby applying through links 173–175 a downwardly directed force on the right side of the swash plate 104 of the forward rotor. At the same time an upward force is applied through links 177–179 to the right side of swash plate 104 of the aft rotor. The effect of the application of such forces to the forward and aft swash plates and thence to the control counterweight assemblies 84 is the same as that previously described with respect to the pilot leaning forwardly and thereby displacing the composite center of gravity of the helicopter toward the forward rotor. Such effect causes the forward and aft rotors (which are rotating in opposite directions as indicated by arrows 54, 55) to undergo cyclic pitch changes resulting in tilting the rotor planes forwardly downwardly.

In addition to the effected cyclic pitch change the application of the downward force on the forward swash plate and the upward force on the aft swash plate tends to reduce the collective pitch of the forward rotor blades and increase the collective pitch of the aft rotor blades by respectively tending to lower and raise the forward and aft swash plates, as previously described. In this manner the aft rotor tends to climb above the forward rotor at the same time the rotor planes tilt forwardly downwardly.

It will be noted that not only may lever 167 be used to trim the attitude of the helicopter of this invention but it may also be employed as a primary means of pitch control, that is the above rotor action tilts the helicopter fuselage about its pitch axis.

Similarly, a second control lever 181 (FIG. 13) centrally supported on the helicopter frame by a ball joint connection 176 for swinging left and right and for rotating about its generally vertical longitudinal axis, may be employed for trimming the helicopter attitude about its roll and yaw axes or as a primary means of effecting roll and yaw control. Handle-bars 169 are fixed to the upper end of lever 181. A lateral extension 192, fixed to the lower end of control lever 181, is connected to operate a double bell crank 182 about stationary pin 193. The opposite ends of bell crank 182 are respectively connected to forward and aft double bell cranks 183, 184 by pivoted links 185, 186 including spring cartridges 187, 188. The opposed arms of each of said latter double bell cranks are respectively connected by links 189, 190 to diametrically opposed points on the forward and aft portions of the nonrotating rings 115 of the forward and aft rotor swash plates 104.

Bell cranks 182, 183, 184 are supported on the helicopter frame by pin and slot connector 193, 191 located centrally between the points of connection of links 185, 186 and 189, 190, respectively. Double bell cranks 183, 184 are thereby supported for tilting about the axes of pins 191 and for raising and lowering with swash plates 104, and bell crank 182 is similarly supported to allow fore and aft motion as well as tilting about pin 193.

Twisting lever 181 by turning handlebars 169 in a counterclockwise direction (as viewed from above) causes extension 192 to swing rearwardly and bell crank 182 to be displaced in the direction of the "left yaw" arrow. Such displacement causes a force to be transmitted through link 185, double bell crank 183, and forward links 189, 190 to forward swash plate 104 tending to tilt it forwardly downwardly. By the previously described effect of the control counterweight assemblies 84 such a disturbing force on the forward swash plate 104 causes the forward rotor plane to tilt to the left. The same force is applied, by such twisting of handlebars 169 and swinging of extension 192, to the aft swash plate with the opposite effect because of the opposite direction of rotation of the aft rotor. The aft rotor thereby tilts to the right effecting turning movement of the helicopter about its yaw axis.

Tilting the handlebars 169 and lever 181 to the left causes rotation of bell crank 182 in the direction of the "left roll" arrow thereby applying equal but opposing forces at similar locations on the forward and aft swash plates. Since the rotors are rotating in opposing directions the applications of these opposite disturbing forces through their respective swash plates causes tilting of both rotor planes to the left thereby effecting translation of the helicopter to the left.

It will be understood that pitch, roll and yaw control in directions opposite to those described is effected by opposite movement of control levers 167, 181. Furthermore, such control levers may be combined into a single lever if desired. In the event the linkage illustrated in FIG. 13 is employed as a primary means of flight control, it may entirely replace the handlebar 44 yaw control previously described.

This application is a continuation in part of application Serial No. 655,300, filed April 26, 1957, now abandoned. Although the invention has been described and illustrated in detail such should not be taken as restrictive thereof as it is obvious that modifications occurring to those skilled in the art are intended to be within the spirit and scope of the invention as defined in the following claims.

We claim:

1. A small helicopter, comprising:
   (a) an elongated fuselage;
   (b) a pair of spaced, substantially parallel, generally vertically extending rotor shafts journalled on said fuselage;
   (c) a rotor having a plurality of rotor blades extending radially from the upper end of each of said shafts and connected thereto at a fixed pitch angle competent to produce substantial lift when said rotors are rotated;
   (d) power means for driving said shafts and said rotors in counter directions;
   (e) disengageable connecting means connecting said power means to said shafts and said rotors and permitting rotation of said rotors when not driven by said power means, and
   (f) said rotors being capable of stable autorotation at a low Reynolds number when said helicopter is in the air and said rotors are not driven by said power means;
   (g) said pitch angle being of the order of 5 to 8 degrees.

2. A small helicopter, comprising:
   (a) an elongated fuselage;
   (b) a pair of spaced, substantially parallel, generally vertically extending rotor shafts journalled on said fuselage;
   (c) a rotor carried by each of said shafts, each including:
      (1) a central hub connected to the upper end of said shaft for rotation therewith; and
      (2) a plurality of elongated, relatively thin, narrow rotor blades extending radially from said hub in a plane generally normal to said shaft and connected at their inner ends to said hub at a predetermined fixed pitch angle with their outer ends free to flex out of said plane;
   (d) power means connected to said shafts for driving the same and said rotors in counter directions;
   (e) each said blade having:
      (1) a sharp leading edge; and
      (2) a forward cambered mean line free from aft positive camber; and
   (f) said pitch angle being at the order of 5 to 8 degrees.

3. A small helicopter, comprising:
   (a) an elongated fuselage;
   (b) a pair of spaced, substantially parallel, generally vertically extending rotor shafts journalled on said fuselage;
   (c) a rotor carried by each of said shafts, each including:
      (1) a central hub connected to the upper end of said shaft for rotation therewith, and
      (2) a plurality of elongated, relatively thin, narrow rotor blades extending radially from said hub in a plane generally normal to said shaft and connected at their inner ends to said hub at a predetermined fixed pitch angle with their outer ends free to flex out of said plane;
   (d) power means connected to said shafts for driving the same and said rotors in counter directions;
   (e) means fixedly connecting each of said blades to said hub supporting said blade at said pitch angle and being sufficiently flexible and resilient to permit limited twisting of said blade about a feathering axis extending generally longitudinally, centrally of said blade;
   (f) means for applying forces to each said blade during rotation of said rotor to cause said twisting, including a control counterweight assembly attached to each said blade for rotation therewith and supported on said hub for oscillation about an axis generally parallel to said feathering axis; and,
   (g) said counterweight assembly being mass-balanced about said feathering axis.

4. The helicopter of claim 3, in which:
   (h) the inertial upsetting moments applied by said counterweight assemblies are substantially equal to the centrifugally induced restoring moments applied by said resilient blade connecting means whereby said assemblies and blades oscillate at a frequency of one cycle per blade revolution when a disturbing force is applied thereto.

5. The helicopter of claim 4, including:
   (i) a swash plate supported on each said rotor shaft for rotation therewith and for tilting with respect thereto;
   (j) means connecting said counterweight assemblies of the blades of each rotor to its respective swash plate causing said assemblies to follow the same track of oscillation throughout each revolution thereof.

6. A small helicopter, comprising:
   (a) an elongated fuselage;
   (b) a pair of spaced, substantially parallel, generally vertically extending rotor shafts journalled on said fuselage;
   (c) a rotor carried by each of said shafts, each including:
      (1) a central hub connected to the upper end of said shaft for rotation therewith; and
      (2) a plurality of elongated, relatively thin, narrow rotor blades extending radially from said hub in a plane generally normal to said shaft and connected at their inner ends to said hub at a predetermined fixed pitch angle with their outer ends free to flex out of said plane;
   (d) power means connected to said shafts for driving the same and said rotors in counter directions;
   (e) means fixedly connecting each of said blades to said hub supporting said blade at said pitch angle and being sufficiently flexible and resilient to permit limited twisting of said blade about a feathering axis extending generally longitudinally, centrally of said blade; and
   (f) means for applying forces to each blade during rotation of said rotor to cause said twisting, including a control counterweight assembly attached to each said blade for rotation therewith and supported on said hub for swinging about an axis generally parallel to said feathering axis outwardly away from said shaft in response to increased rotational speed of said rotor.

7. A small helicopter comprising:
   (a) an elongated, generally horizontally extending fuselage for carrying a load, including a pilot, intermediate the ends thereof;
   (b) a pair of spaced, generally vertically extending rotor shafts journalled in substantially parallel relation for rotation at opposite ends of said fuselage;
   (c) an engine supported on said fuselage;
   (d) drive means connecting said engine to said rotor shafts for rotating the same in counter directions;

(e) a rotor carried by the upper end of each of said rotor shafts, each rotor including:
   (1) a central hub secured to said upper end of said rotor shaft for rotation therewith;
   (2) a plurality of elongated rotor blades extending radially outwardly from said hub in a generally horizontal rotor plane;
   (3) an elongated connector generally aligned with each said blade and rigidly secured to and extending between the inner end thereof and said hub supporting said blade at a predetermined fixed pitch angle with respect to said rotor plane;
   (4) said connector being resiliently flexible about a feathering axis extending generally longitudinally centrally of said blade and after of the line of lift and mass centers thereof for permitting limited twisting of said blade about said axis, and being otherwise substantially rigid;
(f) the combined mass of said fuselage, said load, and said engine being so distributed that its composite center of gravity lies substantially on the effective centerline of thrust of said rotors; and
(g) means responsive to displacement of said composite center of gravity from said centerline of thrust effecting said twisting of said blades.

8. The helicopter of claim 7, in which:
(h) said connector includes a plurality of elongated, relatively thin straps, including:
   (1) a first pair of said straps lying in spaced relation generally in said rotor plane; and
   (2) a second strap lying in a plane normal to said rotor plane and spaced from and generally bisecting the space between said first pair of straps.

9. The helicopter of claim 8, in which:
(i) the planes of said straps intersect at a line coincident with said feathering axis; and
(j) the longitudinal axes of said straps converge at a point on the approximate mid-chord of said blade at three-fourths of the blade length from said rotor shaft.

10. A small helicopter comprising:
(a) an elongated, generally horizontally extending fuselage for carrying a load, including a pilot, intermediate the ends thereof;
(b) a pair of spaced, generally vertically extending rotor shafts journalled in substantially parallel relation for rotation at opposite ends of said fuselage;
(c) an engine supported on said fuselage;
(d) drive means connecting said engine to said rotor shafts for rotating the same in counter directions;
(e) a rotor carried by the upper end of each of said rotor shafts, each rotor including:
   (1) a central hub secured to said upper end of said rotor shaft for rotation therewith;
   (2) a plurality of elongated rotor blades extending radially outwardly from said hub in a generally horizontal rotor plane;
   (3) an elongated connector generally aligned with each said blade and rigidly secured to and extending between the inner end thereof and said hub supporting said blade at a predetermined fixed pitch angle with respect to said rotor plane;
   (4) said connector being resiliently flexible about a feathering axis extending generally longitudinally centrally of said blade and aft of the line of lift and mass centers thereof for permitting limited twisting of said blade about said axis, and being otherwise substantially rigid;
(f) means mounting one of said rotor shafts for tilting from said parallel relation with the other;
(g) control means for applying a force to said one rotor shaft tending to so tilt the same; and
(h) means responsive to the application of said force to said one rotor shaft effecting said twisting of said blades.

11. The helicopter of claim 10, including:
(i) said drive means including:
   (1) a main drive shaft connected to said engine and extending generally longitudinally of said fuselage; and
   (2) right angle gear means connecting opposite ends of said drive shaft to said rotor shafts; and
(j) means mounting said right angle gear means connected to said one rotor shaft for tilting about an axis inclined to said one rotor shaft and lying in the plane of said one rotor shaft and said drive shaft.

12. A small helicopter comprising:
(a) an elongated, generally horizontally extending fuselage for carrying a load, including a pilot, intermediate the ends thereof:
(b) a pair of spaced, generally vertically extending rotor shafts journalled in substantially parallel relation for rotation at opposite ends of said fuselage;
(c) an engine supported on said fuselage;
(d) drive means connecting said engine to said rotor shafts for rotating the same in counter directions;
(e) a rotor carried by the upper end of each of said rotor shafts, each rotor including:
   (1) a central hub secured to said upper end of said rotor shaft for rotation therewith;
   (2) a plurality of elongated rotor blades extending radially outwardly from said hub in a generally horizontal rotor plane;
   (3) an elongated connector generally aligned with each said blade and rigidly secured to and extending between the inner end thereof and said hub supporting said blade at a predetermined fixed pitch angle with respect to said rotor plane;
   (4) said connector being resiliently flexible about a feathering axis extending generally longitudinally centrally of said blade and aft of the line of lift and mass centers thereof for permitting limited twisting of said blade about said axis, and being otherwise substantially rigid;
(f) a control counterweight assembly carried by each said blade for rotation therewith about its respective rotor shaft and effective to so twist said blade in response to disturbing forces applied to said assembly.

13. The helicopter of claim 12, including:
(g) means connecting the control counterweight assemblies of the blades of each rotor for tracking together during rotation of said rotor; and
(h) means attached to said connecting means for applying disturbing forces to said counterweight assemblies of each rotor for changing the attitude of said rotors and their respective rotor shafts.

14. The helicopter of claim 12, in which:
(g) said counterweight assemblies each includes:
   (1) an arm extending transversely of and fixed to said blade and pivotally connected to said hub for swinging about an axis substantially parallel to said feathering axis;
   (2) a counterweight carried by said arm and spaced from said blade for so swinging said arm and thereby twisting said blade.

15. A helicopter rotor, comprising:
(a) a hub adapted to be supported for rotation about a generally vertical axis;
(b) a plurality of rotor blades extending radially from said hub and secured thereto at a predetermined fixed pitch angle of the order of 5 to 8 degrees;
(c) said blades each having a cross section capable, at said pitch angle, of producing substantial lift when so rotated under power and stable autorotation at a low Reynolds number when unpowered.

16. The rotor of claim 15, in which:
(d) said blade has a sharp leading edge and a forward cambered mean line.

(References on following page)

References Cited by the Examiner

UNITED STATES PATENTS

| | | | |
|---|---|---|---|
| 1,350,454 | 8/20 | Hewitt | 244—39 X |
| 2,552,864 | 5/51 | Piasecki | 244—17.23 |
| 2,575,533 | 11/51 | Seibel | 170—160.53 X |
| 2,672,939 | 3/54 | Campbell | 170—135.22 |
| 2,757,745 | 8/56 | Verhage et al. | 170—160.53 X |
| 2,845,131 | 7/58 | Laufer | 170—160.13 |
| 2,847,173 | 8/58 | McCarty | 244—17.11 |
| 3,027,948 | 4/62 | Goland et al. | 170—160.13 |
| 3,063,655 | 11/62 | Shavinsky | 244—17.13 X |
| 3,072,197 | 1/63 | Stahmer | 170—135.2 |

FOREIGN PATENTS

| | | |
|---|---|---|
| 20,530 | 1909 | Great Britain. |
| 1,032,358 | 3/53 | France. |
| 895,128 | 10/53 | Germany. |
| 1,034,984 | 7/58 | Germany. |
| 1,040,906 | 10/58 | Germany. |

FERGUS S. MIDDLETON, *Primary Examiner.*